May 15, 1934.　　　　L. L. BELMONT　　　　1,959,152
FLUID MOTOR
Filed June 10, 1932　　　2 Sheets-Sheet 2
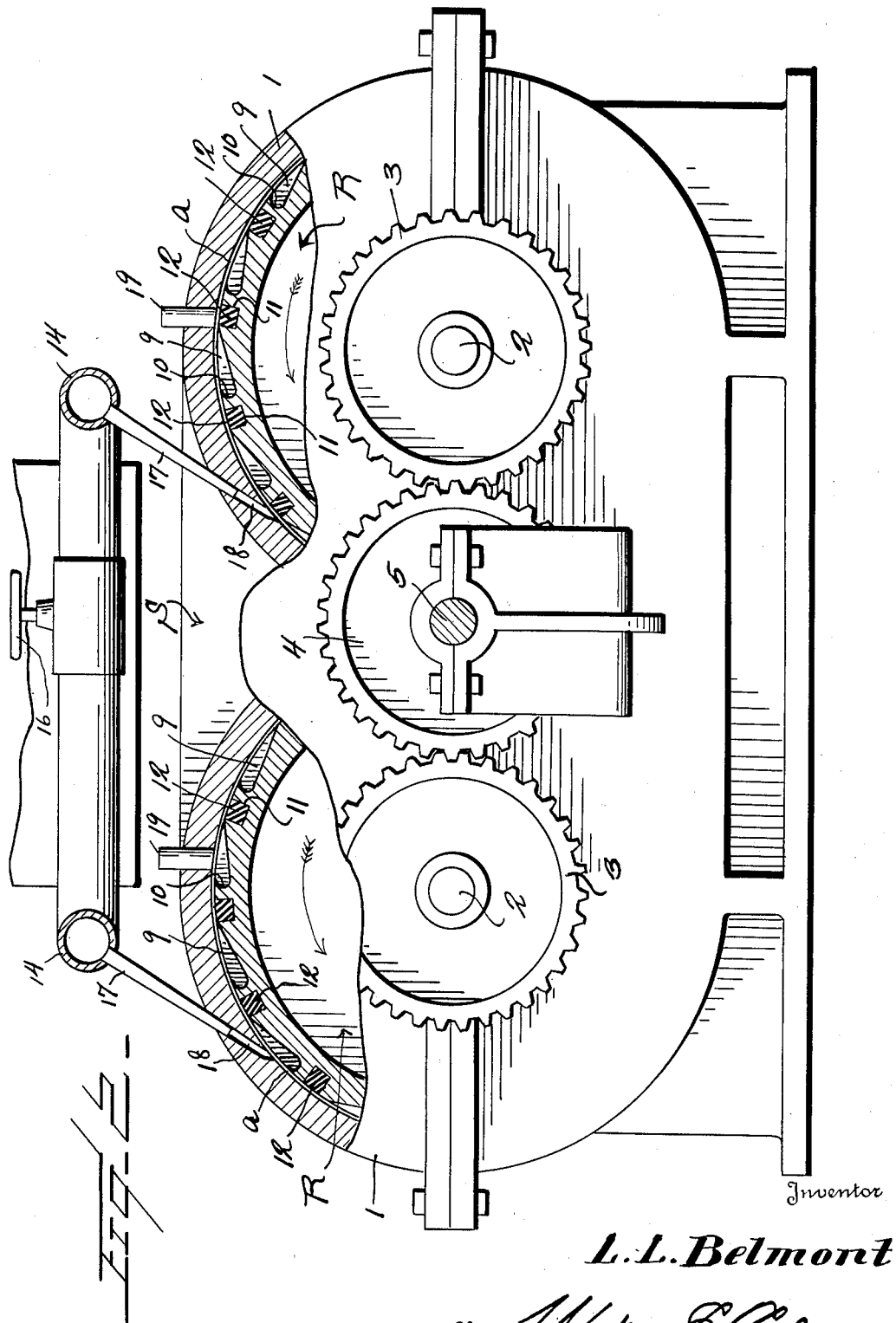
Inventor
*L. L. Belmont*
By *Watson E. Coleman*
Attorney Patented May 15, 1934

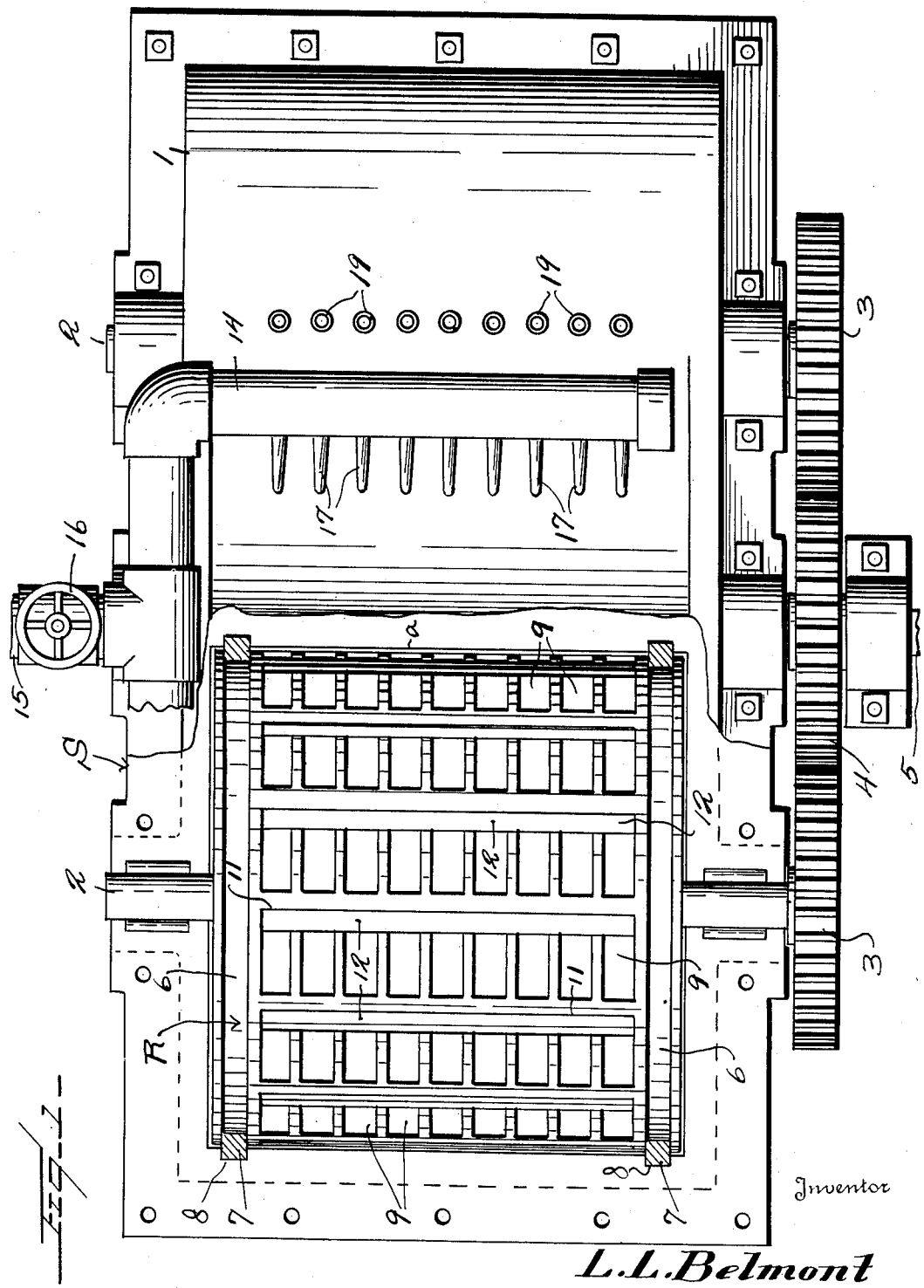

1,959,152

UNITED STATES PATENT OFFICE 1,959,152

FLUID MOTOR

Leonard L. Belmont, Bainbridge, Ga., assignor to Carl E. Welch, Attapulgus, Ga.

Application June 10, 1932, Serial No. 616,515

1 Claim. (Cl. 253—50)

This invention relates to a fluid motor, and it is primarily an object of the invention to provide a motor of this kind including a plurality of rotors assembled in a manner wherein the motor operates under constant pressure.

Another object of the invention is to provide a motor of this kind comprising two rotors constructed and mounted in a manner enabling the same to obtain a very high rate of speed or power, each of said rotors being positioned within a separate stator or chamber but at the same time said rotors being associated with a common carry-off shaft.

An additional object of the invention is to provide a motor of this kind comprising two rotors, each being separately driven by a fluid, such as air under pressure, and each of said rotors having its periphery provided therearound with a series of pockets, the pockets of one of the rotors being so arranged with respect to the pockets of the second rotor and the rotors being in such timed driving connection that while the fluid under pressure is being received in a pocket of one rotor the pockets of the second rotor are in off position and vice versa which results in continuous pressure being transmitted to the carry-off shaft.

A further object of the invention is to provide a motor of this kind comprising a rotor arranged for action within a stator under the influence of a fluid, such as air under pressure, said stator being provided with an inlet and an outlet with the periphery of the rotor spaced from the opposed wall of the stator to allow the fluid as admitted within the stator to travel to the exhaust, the periphery of the rotor at points spaced circumferentially therearound being provided with yielding surfaces with which the fluid under pressure coacts to facilitate the desired rotation of the rotor.

The invention consists in the details of construction and in the combination and arrangement of the several parts of my improved fluid motor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan with a portion broken away of a motor constructed in accordance with an embodiment of my invention;

Figure 2 is a view in side elevation with portions broken away of the motor as illustrated in Figure 1.

As disclosed in the accompanying drawings, S denotes a stator including two cylinder chambers 1 in each of which is arranged for rotation a rotor R. Each of the rotors R is arranged upon and rotates with a shaft 2 rotatably supported by the end walls of its cylinder or chamber 1. The rotor R is of a length to extend substantially from one end to the other of its cylinder or chamber 1 and is of a diameter to closely approach the peripheral wall of its chamber or cylinder but slightly spaced therefrom, as indicated at $a$.

Similar end portions of the shafts 2 have fixed thereto gears 3 of the same size and which mesh with an intermediate gear 4 fixed to a power carry-off shaft 5. The opposite end portions of each of the rotors R have extending circumferentially therearound grooves or channels 6 in which are received the compression rings 7 of a desired type which are also received within the grooves or channels 8 provided in the internal wall of the chamber or cylinder 1. These compression rings 7 are preferably metallic and of the split type generally employed with internal combustion engines and more especially the pistons thereof.

The periphery of each of the rotors R at points equidistantly spaced circumferentially therearound is provided with the series of pockets 9 of desired dimension and which have their bases inwardly inclined in the same general direction as the direction of travel of the rotor whereby each of said pockets provides a forward abutment 10 herein disclosed as substantially semi-circular in form with its outbow forwardly directed.

Between adjacent series of pockets 9 the periphery of the rotor is provided with the longitudinally disposed grooves or channels 11 extending from substantially one end of the rotor to the other and in each of these channels or grooves 11 is inserted a strip 12 of yielding and bodily deformable material, such as a rubber compound or fabric as employed in the production of tire casings and the like. The outer surface of each of the applied strips 12 is substantially flush with the periphery of the rotor proper. Each of the strips 12 is substantially midway of the adjacent series of pockets 9.

These strips of rubber or rubber combined with fabric or similar substances act to automatically decrease or stop the flow of compressed air from port 17, yet being of a yielding surface (softer and more adhesive than metal) the friction of pressure (yet minimum flow of air) assists in power and speed as received from port 17, making the output of power less expensive and more efficient than if a metal surface at this point or space could perform. If this space was metal or plain cylinder surface the loss of air from port 17 would be much more, and the power transmitted to the rotating rotor materially decreased.

Disposed above each of the chambers or cylinders 1 is a manifold 14 leading from a common supply pipe 15 in communication with a source of air or other fluid under pressure, said pipe 15 having interposed therein a cut-off and regulating valve 16. Leading from each of the manifolds 14 is a plurality of pipe lines 17 of a number equal to the number of pockets 9 of a series, said pipes being so spaced apart as to have communication with a separate or individual port 18 disposed through the peripheral wall of a cylinder or chamber 1 for coaction with corresponding pockets 9 of all of the series. It is to be stated at this time that the pockets in all of the series are of the same number and in circumferential alignment.

It is to be particularly noted that the rotors R are so connected one to the other through the instrumentality of the gears 3 and 4 that when the pockets 9 of one series of a rotor R are opened to the pipes or nozzles 17 the pockets 9 of the second rotor R are in off position with respect to the ports 18. By this arrangement the pockets 9 of the rotors are alternately subjected to the direct action of the air or kindred fluid under pressure delivered through the ports 18.

The wall of each of the chambers or cylinders 1 at desired point to the rear of the ports 18 and substantially in circumferential alignment therewith is provided with the exhaust ports 19. Each of the ports 19 is preferably of a diameter not less than twice the diameter of a port 18. It is also to be noted that the ports 18 are disposed on an incline in the same general direction as the direction of rotation of the rotors R which travel in the same direction.

As air under pressure is delivered to the pipes or nozzles 17 and through the ports 18 into the cylinders or chambers 1, the resultant impact will effect rotation of the rotors R at a relatively high rate of speed and which operation is materially facilitated by the alternate arrangement of the pockets of one rotor with respect to the pockets of the second rotor. The space $a$ between each of the rotors and the peripheral wall of its cylinder or chamber 1 also allows air to travel in such space and when this action occurs the air will meet effective frictional resistance by the exposed surfaces of the strips 12 whereby the desired travel of the rotors R is further facilitated. In other words, by the provision of the strips or fillers 12 between adjacent series of pockets 9 each of the rotors is subjected, when the motor is in operation, to a substantially continuous pressure.

The operation of my improved motor is further facilitated in view of the fact that each of the rotors R is at no time in contact with the stator except through the medium of the compression rings 7, thus assuring the desired rotation of the rotors with frictional resistance to such rotation substantially eliminated.

The space $a$ in actual practice is very slight and preferably about 1/200 of an inch so that a minimum amount of air is allowed to escape from the air pockets 9 until such pockets reach the exhaust.

It is also to be stated that the compression rings 7 do not fit tight in a circumferential direction but form the desired compression by fitting close to the sides of the channels 6 and 8 so that even though such rings should wear to a feather edge they will still provide perfect compression in that the more pressure from the inside greater or harder the rings fit against the side walls of the channels 6 and 8. In practice these rings 7 and the grooves or channels 6 and 8 are intended to be lubricated by force oil pumps as the contact afforded by the rings 7 are the only points of contact in the rotor except the mountings or bearings for the shaft 2 of the rotor and which mountings or bearings are of a roller or kindred type. It is, therefore, believed to be self-evident that frictional resistance to the rotation of the rotor R is reduced to a minimum.

From the foregoing description it is thought to be obvious that a fluid motor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A rotary engine comprising two independent cylinders, a rotor mounted in each of the cylinders, means for connecting said rotors for unitary rotation, pockets in the peripheries of the rotors spaced apart in a direction circumferential of the rotors, the periphery of each of the rotors being spaced from the associated wall of its cylinder, means for admitting fluid under pressure within each of the cylinders, each of said cylinders being provided with an exhaust, and a strip of yieldable and deformable material embedded in the periphery of each of the rotors between adjacent circumferentially spaced pockets, the outer surface of said strip being substantially flush with the periphery of the rotor proper and exposed to the action of the fluid under pressure, said strip extending substantially from one end of the rotor to the other.

LEONARD L. BELMONT.